(12) United States Patent
Park et al.

(10) Patent No.: US 10,291,094 B2
(45) Date of Patent: May 14, 2019

(54) MOTOR FRAME (71) Applicant: Hyundai Heavy Industries Co., Ltd., Ulsan (KR)

(72) Inventors: Yun Bum Park, Ulsan (KR); Kwang Jin Han, Ulsan (KR); Jin Hyuk Yoo, Ulsan (KR); Young Hoon Jung, Ulsan (KR)

(73) Assignee: Hyundai Electric & Energy Systems Co., Ltd., Seoul (KR)

( * ) Notice: Subject to any disclaimer, the term of this patent is extended or adjusted under 35 U.S.C. 154(b) by 161 days.

(21) Appl. No.: 15/224,827

(22) Filed: Aug. 1, 2016

(65) Prior Publication Data

US 2017/0179785 A1 Jun. 22, 2017

(30) Foreign Application Priority Data

Dec. 17, 2015 (KR) .......................... 10-2015-0181235

(51) Int. Cl.
*H02K 5/20* (2006.01)
*H02K 9/14* (2006.01)

(52) U.S. Cl.
CPC ................. *H02K 5/20* (2013.01); *H02K 9/14* (2013.01)

(58) Field of Classification Search
CPC .................................. H02K 5/20; H02K 9/14
USPC ........................................................... 310/58
See application file for complete search history.

(56) References Cited

U.S. PATENT DOCUMENTS

| 2009/0261668 A1 | 10/2009 | Mantere | |
| 2014/0077633 A1* | 3/2014 | Nagao | H02K 5/20 310/54 |
| 2016/0254728 A1 | 9/2016 | Zhou et al. | |
| 2017/0025928 A1 | 1/2017 | Luise et al. | |
| 2018/0351431 A1* | 12/2018 | Kim | H02K 5/161 |

FOREIGN PATENT DOCUMENTS

| DE | 19510018 A1 | 10/1996 |
| EP | 1816726 A2 | 8/2007 |
| EP | 2482428 A2 | 8/2012 |
| JP | 2002-281699 A | 9/2002 |
| JP | 4316411 B2 | 8/2009 |
| JP | 2015208101 A | 11/2015 |
| KR | 10-2013-0048908 A | 5/2013 |
| WO | 2015/070675 A1 | 5/2015 |
| WO | 2015/150100 A1 | 10/2015 |

OTHER PUBLICATIONS

Non English Translation of Office Action dated Jun. 27, 2017, in corresponding Japanese Application No. 2016-141063 (4 pages).
European Search Report for European Patent Application No. 16186647.0, dated Apr. 18, 2017, 8 pages.

* cited by examiner

*Primary Examiner* — Terrance L Kenerly (74) *Attorney, Agent, or Firm* — Mintz Levin Cohn Ferris Glovsky and Popeo, P.C.; Peter F. Corless (57) ABSTRACT

A motor frame is disclosed. According to an exemplary embodiment in the present disclosure, a motor frame includes a main frame including a component of a motor provided therein; and a front cover and a rear cover covering an open front surface and an open rear surface of the main frame, respectively, and having cores into which the component of the motor is inserted, respectively, in which a region between the main frame and the cores is asymmetrical in a vertical direction.

9 Claims, 7 Drawing Sheets

MOTOR FRAME

CROSS-REFERENCE TO RELATED APPLICATION

This application claims benefit of priority to Korean Patent Application No. 10-2015-0181235 filed on Dec. 17, 2015 in the Korean Intellectual Property Office, the disclosure of which is incorporated herein by reference in its entirety.

BACKGROUND

1. Field

The present disclosure relates to a motor frame including a component of a motor such as a rotor or a stator and, more specifically, to a motor frame having a region between a main frame including a component of a motor provided therein, and cores respectively formed on front and rear covers covering open front and rear surfaces of the main frame, the region being asymmetrical in a vertical direction.

2. Description of Related Art

A motor frame may include a component of a motor such as a rotor or a stator.

Figure 7:
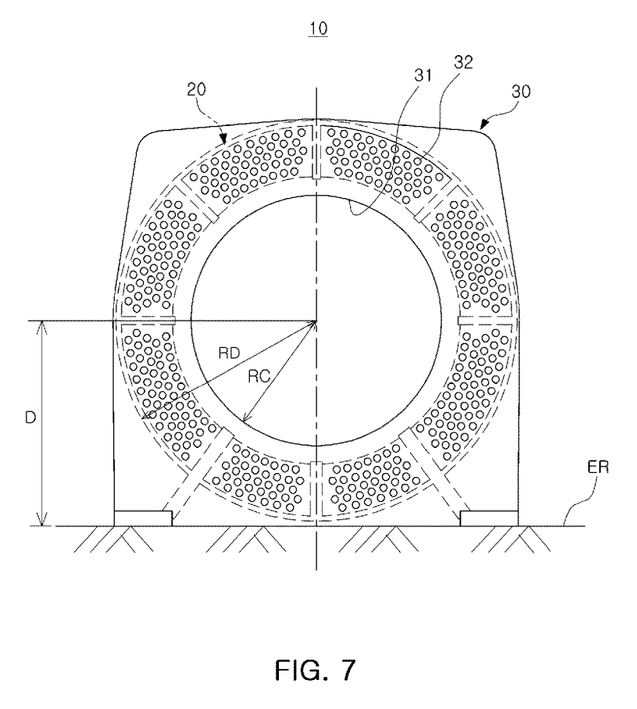
FIG. 7 is a front view of a conventional motor frame.

As illustrated in FIG. 7, a conventional motor frame 10 may include a main frame 20 including a component of a motor provided therein, and a front cover 30 and a rear cover covering an open front surface and an open rear surface of the main frame 20, respectively.

FIG. 7 is a front view, and thus illustrates only the front cover 30 without the rear cover.

The front cover 30 and the rear cover may have cores 31 respectively formed thereon. The component of the motor may be inserted through the cores 31 respectively formed on the front cover 30 and the rear cover to be provided in the main frame 20.

The main frame 20 of the conventional motor frame 10 may be cylindrical, and may be concentric with the cores 31. A radius RD of the main frame 20 may also be greater than radii RC of the cores 31.

Accordingly, a gap may be formed between the main frame 20 and the component of the motor provided in the main frame 20. Cooling tubes TC through which a cooling fluid flows may be provided in the gap so that heat generated by operations of the component of the motor may be dissipated.

The cooling tubes TC may be inserted into or connected to insertion holes 32 formed in the front cover 30 and the rear cover, respectively.

A distance between centers of the cores 31 and the surface of the ground ER may be referred to as a shaft height D, and may indicate a size of the motor.

Meanwhile, only when the cores 31 are increased in size, the component of the motor provided in the main frame 20 may be increased in size so that an output of the motor may be increased.

However, when the cores 31 are increased in size, the gap in which the cooling tubes TC may be provided may be reduced, and the component of the motor may not thus be easily cooled.

Therefore, when the motor is manufactured by using the motor frame 10 including the main frame 20 and the cores 31, concentric with each other, an increase in an output of the motor may be limited.

SUMMARY

An aspect of the present disclosure may provide a motor frame that may increase an output of a motor under the same shaft height conditions.

Another aspect of the present disclosure may provide a motor frame that may enable a motor to be easily cooled even when an output of the motor is increased.

Another aspect of the present disclosure may provide a motor frame that may have a region between a main frame including a component of a motor provided therein and cores respectively formed on front and rear covers covering open front and rear surfaces of the main frame, the region being asymmetrical in a vertical direction.

According to an exemplary embodiment in the present disclosure, a motor frame may include: a main frame including a component of a motor provided therein; and a front cover and a rear cover covering an open front surface and an open rear surface of the main frame, respectively, and having cores into which the component of the motor is inserted, respectively, in which a region between the main frame and the cores is asymmetrical in a vertical direction.

The main frame may include a plurality of frame formation portions being portions of a cylinder, having different respective radii of curvature, and coupled to each other.

The main frame may include a first frame formation portion and a second frame formation portion coupled to each other.

The second frame formation portion may form a lower portion of the main frame, and the first frame formation portion may form the remainder of the main frame.

A radius of curvature of the second frame formation portion may be greater than a radius of curvature of the first frame formation portion.

The second frame formation portion may be a flat plate.

Centers of the cores may be positioned below a center of the main frame that is cylindrical.

The cores may be cylindrical.

A radius of each of the cores may be smaller than the radius of curvature of each of the plurality of the frame formation portions having the different respective radii of curvature and coupled to each other to form the main frame, or smaller than a radius of the main frame that is cylindrical.

Portions of the front cover and the rear cover, between the main frame and the cores may be provided with a cooling tube provided in a space between the main frame and the cores.

The front cover and the rear cover may have an insertion hole which the cooling tube may be inserted into or connected to.

The cooling tube may be provided as a plurality of cooling tubes, in which an arrangement height of the plurality of cooling tubes provided in lower portions of a space between the main frame and the cores may be lower than an arrangement height of the plurality of cooling tubes provided in upper portions of the space between the main frame and the cores.

A space between the main frame and the component of the motor may have a passage space through which a cable connected to the component of the motor passes.

The passage space may be partitioned by a blocking member in such a manner that air heated by heat generated by operations of the component of the motor does not flow in the passage space.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, and may include changes in shapes resulting from manufacturing errors. The following embodiments may also be constituted by one or a combination thereof.

The contents of the present disclosure described below may have a variety of configurations and only a required configuration is proposed herein, but the present disclosure is not limited thereto.

In order to help understand features of the present disclosure, a motor frame according to exemplary embodiments in the present disclosure will hereinafter be described in more detail.

Hereinafter, embodiments of the present disclosure will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

First Exemplary Embodiment

Hereinafter, a motor frame according to a first exemplary embodiment in the present disclosure will be described with reference to FIGS. 1 through 3.

Figure 1:
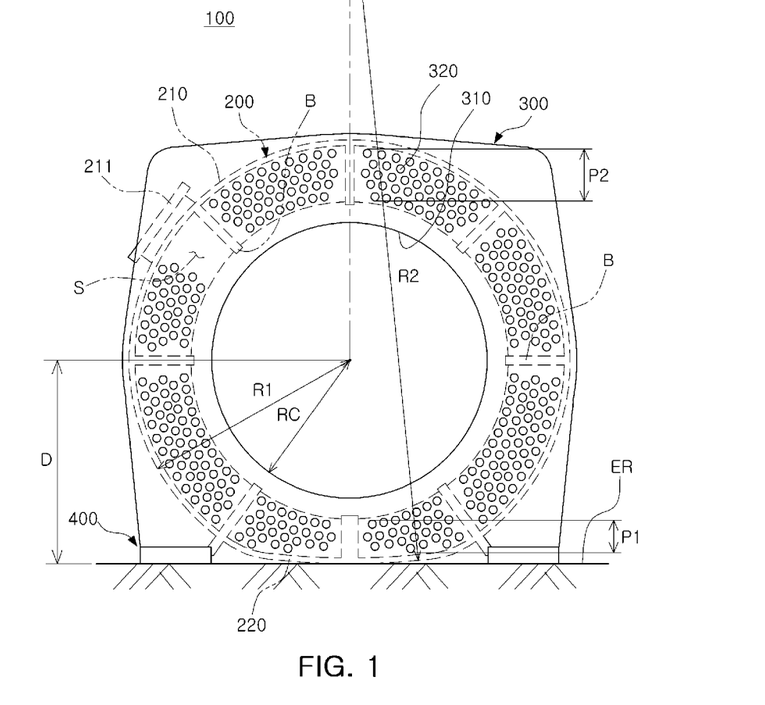
FIG. 1 is a front view of a motor frame according to a first exemplary embodiment in the present disclosure.

FIG. 1 is a front view of the motor frame according to the first exemplary embodiment in the present disclosure. FIG. 2 is a perspective view of the motor frame according to the first exemplary embodiment in the present disclosure. FIG. 3 is an exploded perspective view of a main frame included in the motor frame according to the first exemplary embodiment in the present disclosure.

Figure 2:
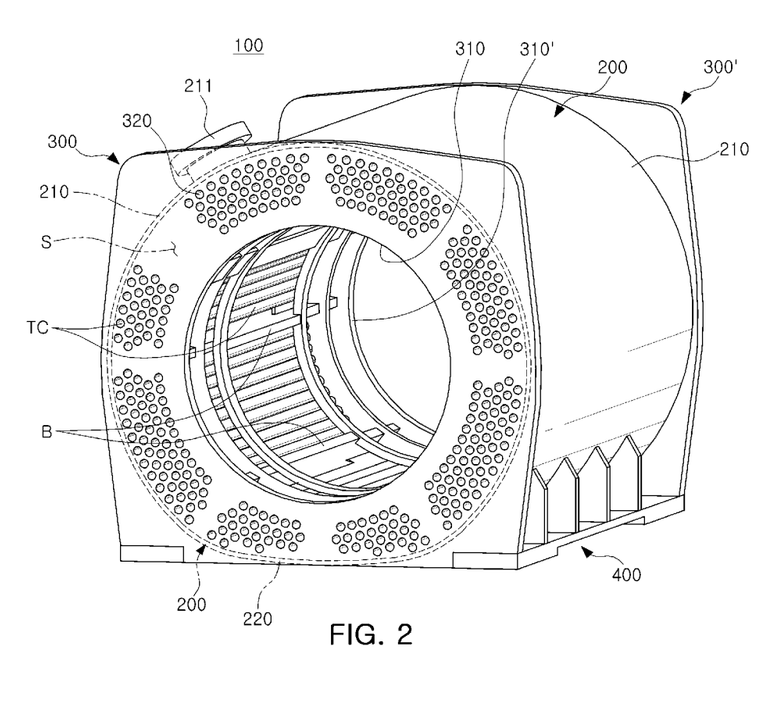
FIG. 2 is a perspective view of the motor frame according to the first exemplary embodiment in the present disclosure.

A motor frame 100 according to the first exemplary embodiment in the present disclosure may include a main frame 200, a front cover 300, and a rear cover 300' as illustrated in FIGS. 1 and 2.

The main frame 200 may include a component (not illustrated) of a motor such as a rotor or a stator provided therein.

A region between the main frame 200 and cores 310 and 310' to be described hereinafter and respectively formed on the front cover 300 and the rear cover 300' in such a manner that the component of the motor may be inserted into the region, may be asymmetrical in a vertical direction.

To this end, the main frame 200 may be formed of a plurality of frame formation portions coupled to each other.

The plurality of frame formation portions may be coupled to each other by, for example, welding. A configuration in which the plurality of frame formation portions may be coupled to each other is not particularly limited, and any well-known configuration in which the plurality of frame formation portions may be coupled to each other by a rivet or the like may be used.

The plurality of frame formation portions may be portions of a cylinder, and may have radii of curvature different from each other, respectively. The radii of curvature of the plurality of frame formation portions are not particularly limited, and any radii of curvature may be used if different from each other.

Figure 3:
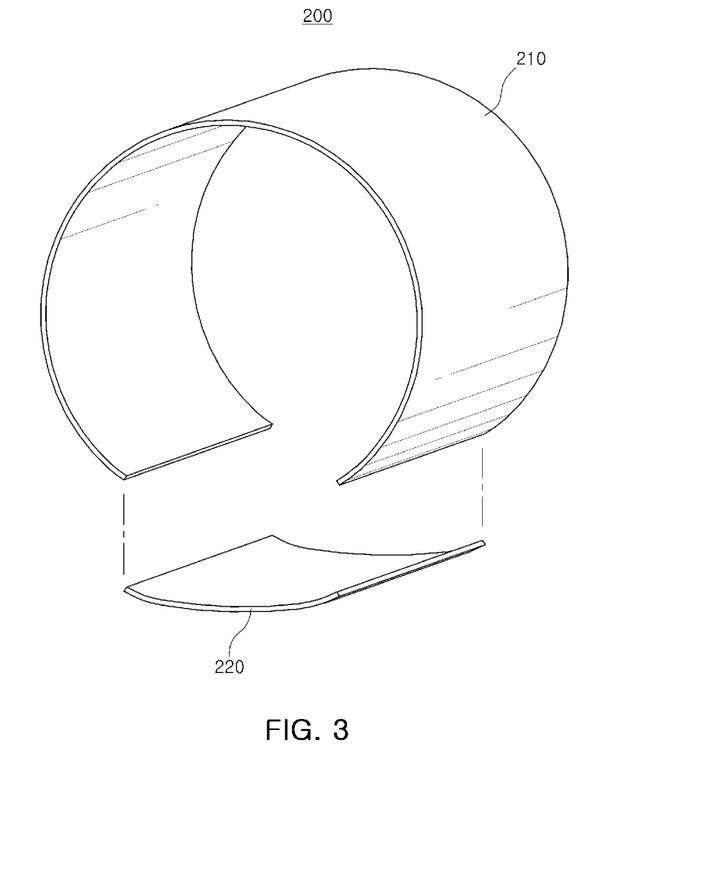
FIG. 3 is an exploded perspective view of a main frame included in the motor frame according to the first exemplary embodiment in the present disclosure.

The main frame 200 may be formed of, for example, the first frame formation portion 210 and the second frame formation portion 220 coupled to each other as illustrated in FIG. 3. The number of the plurality of frame formation portions forming the main frame 200 is, however, not particularly limited, and three or more frame formation portions may be used.

The second frame formation portion 220 may form a lower portion of the main frame 200. The first frame formation portion 210 may also form the remainder of the main frame 200. The radius of curvature R2 of the second frame formation portion 220 may be greater than a radius of curvature R1 of the first frame formation portion 210.

Accordingly, an arrangement height P1 of cooling tubes TC described below and provided in lower portions of a space between the main frame 200 and the cores 310 and 310' may be lower than an arrangement height P2 of cooling tubes TC described below and provided in upper portions of the space between the main frame 200 and the cores 310 and 310'.

Therefore, the cores 310 and 310' may be increased in size as compared to a core 31 of a conventional motor frame 10 (refer to FIG. 7) under the same conditions that a shaft height D, that is, a distance from the cores 310 and 310' respectively formed on the front cover 300 and the rear cover 300' to the surface of the ground ER, is equal to a shaft height D of the conventional motor frame 10.

Accordingly, the component of the motor provided in the main frame 200 may become larger, and a motor having a greater output than that of the motor having the same shaft height D as the conventional motor frame 10 may be manufactured.

Since the main frame 200 forms an overall curved surface, pressure resistance thereof may be increased.

The main frame 200 may include a frame member B. This may allow the main frame 200 to be increased in stiffness.

The front cover 300 and the rear cover 300' may cover an open front surface and an open rear surface of the main frame 200, respectively. The front cover 300 and the rear cover 300' may be coupled to the main frame 200 by, for example, welding to cover the open front surface and the open rear surface of the main frame 200, respectively. A configuration in which the front cover 300 and the rear cover 300' may be coupled to the main frame 200 is not particularly limited, and any well-known configuration in which the front cover 300 and the rear cover 300' may be coupled to the main frame 200 by a rivet or the like may be used.

The front cover 300 and the rear cover 300' may have the cores 310 and 310' respectively formed thereon. The cores 310 and 310' may allow the component of the motor to be inserted therethrough to be positioned in the main frame 200.

The cores 310 and 310' may be circular. A shape of each of the cores 310 and 310' is not particularly limited, and any shape in which the component of the motor may be inserted to be positioned in the main frame 200 may be used.

Radii RC of the cores 310 and 310' may be smaller than the radii of curvature R1 and R2 of the first frame formation portion 210 and the second frame formation portion 220. In more detail, the radii RC of the cores 310 and 310' may be smaller than a smaller of the radii of curvature R1 and R2 of the first frame formation portion 210 and the second frame formation portion 220.

Accordingly, even in a case in which the component of the motor is provided in the main frame 200, a gap may be formed between the main frame 200 and the component of the motor provided in the main frame 200. The cooling tubes TC as described below may be provided in the gap so that a cooling fluid flows in the cooling tubes TC, thereby dissipating heat generated by operations of the component of the motor.

The cooling tubes TC may be provided in portions of the front cover 300 and the rear cover 300' between the main frame 200 and the cores 310 and 310'. To this end, the front cover 300 and the rear cover 300' may have insertion holes 320 respectively formed therein so that one end of each of the cooling tubes TC and the other end thereof are inserted into or connected to the insertion holes 320.

One end of each of the cooling tubes TC and the other end thereof may be connected to each of the insertion holes 320 by, for example, welding. However, a configuration in which one end of each of the cooling tubes TC and the other end thereof may be connected to each of the insertion holes 320 is not particularly limited, and any well-known configuration in which one end of each of the cooling tubes TC and the other end thereof may be connected to each of the insertion holes 320 by a rivet or the like may be used.

The cooling tubes TC may allow a cooling fluid, for example, air, to flow therein. When the cooling fluid is air, the air may flow in the cooling tubes TC through the insertion holes 320 respectively formed in the front cover 300 and the rear cover 300' may then move in the cooling tubes TC, and may be externally released through the insertion holes 320.

The cooling fluid is not limited to air, and any well-known cooling fluid such as a coolant or a refrigerant that may dissipate heat generated by the component of the motor provided in the main frame 200 may be used.

A plurality of the cooling tubes TC may be provided. However, the number of cooling tubes TC is not particularly limited, and any number of cooling tubes TC which may dissipate heat generated by the component of the motor may be used.

Meanwhile, a passage space S through which a cable (not illustrated) connected to the component of the motor passes may be formed in a space between the main frame 200 and the component of the motor.

For example, the cooling tubes TC may not be provided in portions of the space between the main frame 200 and the component of the motor so that the passage space S can be formed.

The passage space S may be formed on a side of the first frame formation portion 210 as illustrated in FIGS. 1 and 2. However, the passage space S may also be formed on a side of the second frame formation portion 220, and may be formed on any position of the space between the main frame 200 and the component of the motor.

In addition, a hole 211 which communicates with the passage space S so that a cable may be inserted into or removed from the hole 211 may be formed in the main frame 200.

As illustrated in FIGS. 1 and 2, the hole 211 may be formed in the first frame formation portion 210. The hole 211 may also be however formed in the second frame formation portion 220, and may be formed in any position of the main frame 200 as long as the hole 211 can communicate with the passage space S.

The motor frame 100 according to the first exemplary embodiment in the present disclosure may further include support portions 400 supporting the main frame 200 so that the motor frame 100 may be placed on the surface of the ground ER.

A configuration and a shape of the support portions 400 are not particularly limited, and any configuration and shape that may support the main frame 200 so that the motor frame 100 may be placed on the surface of the ground ER may be used.

Second Exemplary Embodiment

Hereinafter, a motor frame according to a second exemplary embodiment in the present disclosure will be described with reference to FIG. 4.

Figure 4:
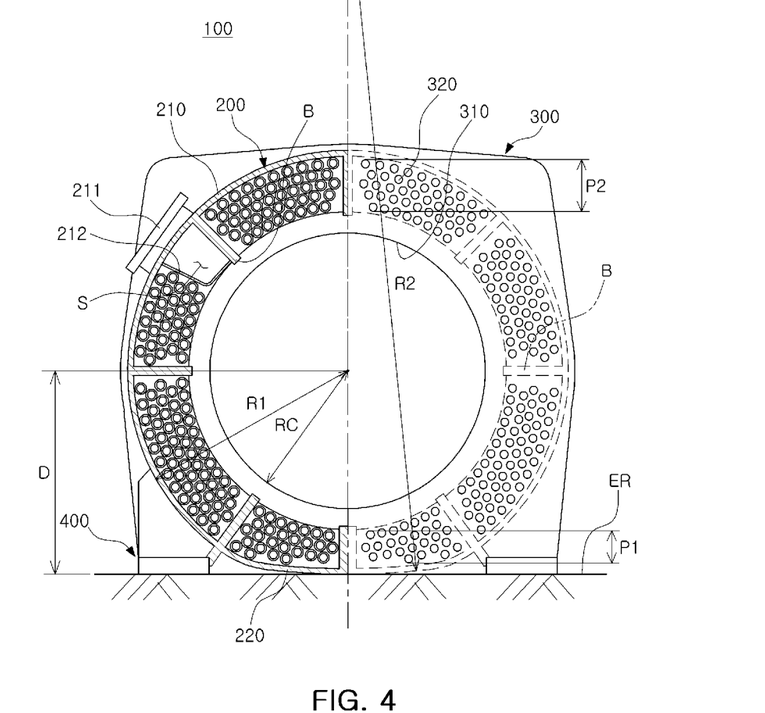
FIG. 4 is a front view of a motor frame according to a second exemplary embodiment in the present disclosure, from which a left half of a front cover is removed.

FIG. 4 is a front view of the motor frame according to the second exemplary embodiment in the present disclosure, from which a left half of a front cover is removed.

Here, the motor frame according to the second exemplary embodiment in the present disclosure may differ from the motor frame according to the first exemplary embodiment in the present disclosure described with reference to FIGS. 1 through 3 in that a passage space S may be partitioned by a blocking member 212.

Accordingly, descriptions of the motor frame to the same as those of the second exemplary embodiment will focus on distinctive configurations thereof, and the description of the remaining configuration will be provided by that of the motor frame described with reference to FIGS. 1 to 3.

As illustrated in FIG. 4, the passage space S of the motor frame according to the second exemplary embodiment in the present disclosure may be partitioned by the blocking member 212. For example, as illustrated in FIG. 4, the blocking member 212 may partition the passage space S along with a frame member B. The passage space S may also be partitioned only by the blocking member 212.

As such, since the passage space S may be partitioned by the blocking member 212, air heated by heat generated by operations of a component of the motor may be prevented from flowing in the passage space S. Therefore, when the component of the motor is operated, a cable passing through the passage space S may be prevented from being deformed or damaged by being heated.

Third Exemplary Embodiment

Hereinafter, a motor frame according to a third exemplary embodiment in the present disclosure will be described with reference to FIG. 5.

Figure 5:
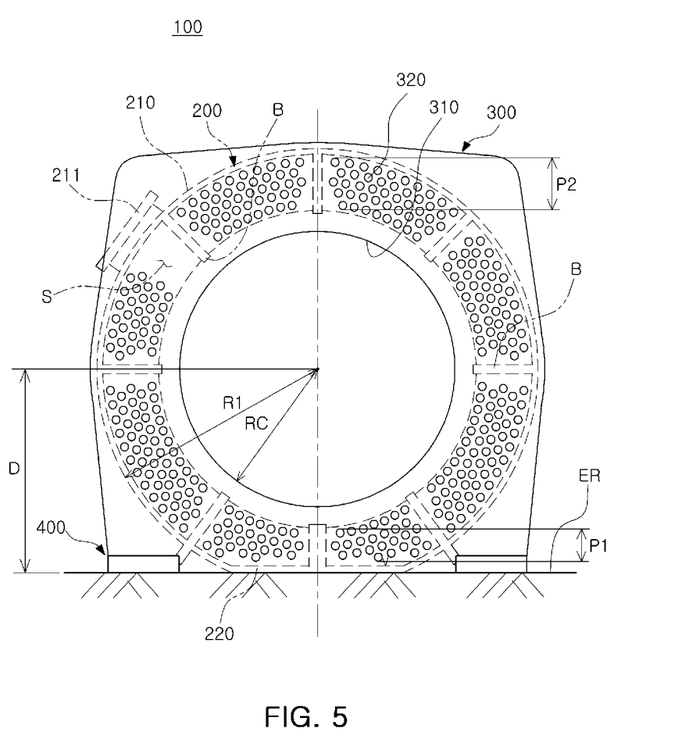
FIG. 5 is a front view of a motor frame according to a third exemplary embodiment in the present disclosure.

FIG. 5 is a front view of the motor frame according to the third exemplary embodiment in the present disclosure.

Here, the motor frame according to the third exemplary embodiment in the present disclosure may differ from the motor frame according to the first exemplary embodiment in the present disclosure described with reference to FIGS. 1 through 3 in a shape of a second frame formation portion.

Accordingly, a description of the motor frame according to the third exemplary embodiment will focus on a distinctive configuration thereof, and the remaining configuration will be replaced by that of the motor frame described with reference to FIGS. 1 to 3.

As illustrated in FIG. 5, a second frame formation portion 220 of the motor frame according to the third exemplary embodiment in the present disclosure may be a flat plate.

This may cause a region between a main frame 200 and cores 310 and 310' to be asymmetrical in a vertical direction.

An arrangement height P1 of cooling tubes TC provided in lower portions of a space between the main frame 200 and the cores 310 and 310' may be lower than an arrangement height P2 of cooling tubes TC provided in upper portions of the space between the main frame 200 and the cores 310 and 310'.

Therefore, the cores 310 and 310' may be increased in size as compared to the core 31 of the conventional motor frame 10 (refer to FIG. 7) under the same conditions that a shaft height D, that is, a distance from the cores 310 and 310' to the surface of the ground ER, is equal to the shaft height D of the conventional motor frame 10.

Accordingly, the component of the motor provided in the main frame 200 may become larger, and a motor having a greater output than that of the motor having the same shaft height D as the conventional motor frame 10 may be manufactured.

Fourth Exemplary Embodiment

Hereinafter, a motor frame according to a fourth exemplary embodiment in the present disclosure will be described with reference to FIG. 6.

Figure 6:
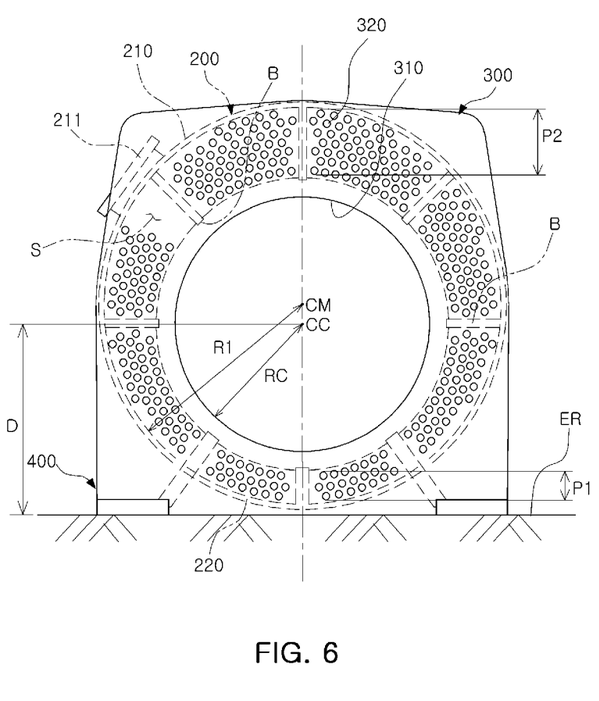
FIG. 6 is a front view of a motor frame according to a fourth exemplary embodiment in the present disclosure.

FIG. 6 is a front view of the motor frame according to the fourth exemplary embodiment in the present disclosure.

Here, the motor frame according to the fourth exemplary embodiment in the present disclosure may differ from the motor frame according to the first exemplary embodiment in the present disclosure described with reference to FIGS. 1 through 3 in that centers of cores are positioned below that of a main frame that is cylindrical.

Accordingly, descriptions of the motor frame to the same as those of the fourth exemplary embodiment will focus on distinctive configurations thereof, and the descriptions of the remaining configuration will be provided by that of the motor frame described with reference to FIGS. 1 to 3.

As illustrated in FIG. 6, the motor frame according to the fourth exemplary embodiment in the present disclosure may differ in that centers CC of cores 310 and 310' may be positioned below a center CM of a main frame 200 that is cylindrical.

This may cause a region between the main frame 200 and the cores 310 and 310' to be asymmetrical in a vertical direction.

An arrangement height P1 of cooling tubes TC provided in lower portions of a space between the main frame 200 and the cores 310 and 310' may be lower than an arrangement height P2 of cooling tubes TC provided in upper portions of the space between the main frame 200 and the cores 310 and 310'.

Therefore, the cores 310 and 310' may be increased in size as compared to the core 31 of the conventional motor frame 10 (please refer to FIG. 7) under the same conditions that a shaft height D, that is, a distance from the cores 310 and 310' to the surface of the ground ER, is equal to the shaft height D of the conventional motor frame 10.

Accordingly, the component of the motor provided in the main frame 200 may become larger, and a motor having a greater output than that of the motor having the same shaft height D as the conventional motor frame 10 may be manufactured.

As described above, a motor frame according to an exemplary embodiment in the present disclosure may have a region between a main frame including a component of a motor provided therein and cores formed on a front cover and a rear cover respectively covering an open front surface and an open rear surface of the main frame, the region being asymmetrical in a vertical direction, may increase an output of the motor under the same shaft height conditions, and may readily cool the motor even in a case in which an output of the motor is increased.

The motor frame as described above is not limited to the configurations of the exemplary embodiments described above, and may also be configured by selectively combining the whole or a part of the respective exemplary embodiments in such a manner that various modifications thereof may be made.

As set forth above, according to exemplary embodiments in the present disclosure, a motor frame may have a region between a main frame including a component of a motor provided therein and cores respectively formed on front and rear covers covering open front and rear surfaces of the main frame, the region having an asymmetrical shape in a vertical direction.

Further, according to exemplary embodiments in the present disclosure, a motor frame that may increase an output of a motor under the same shaft height condition may be provided.

Further, according to exemplary embodiments in the present disclosure, a motor frame that may easily cool a motor even when an output of the motor is increased may be provided.

While embodiments have been shown and described above, it will be apparent to those skilled in the art that modifications and variations could be made without departing from the scope of the present invention as defined by the appended claims.

What is claimed is:

1. A motor frame comprising:
   a main frame including a component of a motor provided therein; and
   a front cover and a rear cover covering an open front surface and an open rear surface of the main frame, respectively, and having cores into which the component of the motor is inserted, respectively,
   wherein a region between the main frame and the cores is asymmetrical in a vertical direction,
   wherein the main frame includes a plurality of frame formation portions being portions of a cylinder, having different respective radii of curvature, and coupled to each other, or centers of the cores are positioned below a center of the main frame that is cylindrical,
   wherein portions of the front cover and the rear cover, between the main frame and the cores are provided within a cooling tube provided in a space between the main frame and the cores, wherein a space between the main frame and the component of the motor has a passage space through which a cable connected to the component of the motor passes, wherein the passage space is partitioned by a blocking member in such a manner that air heated by heat generated by operations of the component of the motor does not flow in the passage space, and wherein the main frame includes a frame member and the blocking member partitions the passage space along with the frame member.

2. The motor frame of claim 1, wherein the main frame includes a first frame formation portion and a second frame formation portion coupled to each other.

3. The motor frame of claim 2, wherein the second frame formation portion forms a lower portion of the main frame, and the first frame formation portion forms the remainder of the main frame.

4. The motor frame of claim 3, wherein a radius of curvature of the second frame formation portion is greater than a radius of curvature of the first frame formation portion.

5. The motor frame of claim 4, wherein the second frame formation portion is a flat plate.

6. The motor frame of claim 1, wherein the cores are cylindrical.

7. The motor frame of claim 6, wherein a radius of each of the cores is smaller than the radius of curvature of each of the plurality of the frame formation portions having the different respective radii of curvature and coupled to each other to form the main frame, or smaller than a radius of the main frame that is cylindrical.

8. The motor frame of claim 1, wherein the front cover and the rear cover have an insertion hole which the cooling tube is inserted into or connected to.

9. The motor frame of claim 1, wherein the cooling tube is provided as a plurality of cooling tubes, and an arrangement height of the plurality of cooling tubes provided in lower portions of a space between the main frame and the cores is lower than an arrangement height of the plurality of cooling tubes provided in upper portions of the space between the main frame and the cores.

* * * * *